(12) United States Patent
Bellof et al.

(10) Patent No.: US 10,435,156 B2
(45) Date of Patent: Oct. 8, 2019

(54) TRANSPORT APPARATUS

(71) Applicant: Deutsche Post AG, Bonn (DE)

(72) Inventors: Marco Bellof, Aachen (DE); Felix Orth, Aachen (DE); Martin Sommer, Aachen (DE)

(73) Assignee: DEUTSCHE POST AG, Bonn (DE)

( * ) Notice: Subject to any disclaimer, the term of this patent is extended or adjusted under 35 U.S.C. 154(b) by 53 days.

(21) Appl. No.: 15/913,271

(22) Filed: Mar. 6, 2018

(65) Prior Publication Data
US 2018/0257781 A1 Sep. 13, 2018

(30) Foreign Application Priority Data

Mar. 7, 2017 (DE) .................. 10 2017 104 707

(51) Int. Cl.
*B64D 9/00* (2006.01)
*B64C 39/02* (2006.01)
*B64D 1/10* (2006.01)
*B64D 1/12* (2006.01)

(52) U.S. Cl.
CPC .............. *B64D 9/00* (2013.01); *B64C 39/024* (2013.01); *B64D 1/10* (2013.01); *B64D 1/12* (2013.01); *B64C 2201/108* (2013.01); *B64C 2201/128* (2013.01); *B64C 2201/141* (2013.01)

(58) Field of Classification Search
CPC .... B64D 9/00; B64D 1/10; B64D 1/12; B64C 2201/121; B64C 2201/128
See application file for complete search history.

(56) References Cited

U.S. PATENT DOCUMENTS

| 9,174,733 | B1 | 11/2015 | Burgess et al. |
| 9,321,531 | B1* | 4/2016 | Takayama ................ B64D 1/12 |
| 9,688,404 | B1* | 6/2017 | Buchmueller ........... B64D 1/12 |
| 9,817,396 | B1* | 11/2017 | Takayama ............ G05D 1/0038 |
| 9,944,366 | B2* | 4/2018 | Tang ........................ B63C 9/01 |
| 10,040,370 | B2* | 8/2018 | Wei ...................... B60L 11/1879 |
| 10,358,196 | B2* | 7/2019 | Tang ........................ B63C 9/01 |
| 2015/0120094 | A1 | 4/2015 | Kimchi et al. |
| 2016/0059963 | A1 | 3/2016 | Burgess et al. |

(Continued)

FOREIGN PATENT DOCUMENTS

| DE | 202015105415 U1 | 10/2015 |
| DE | 10 2015 206 844 | 11/2015 |

(Continued)

OTHER PUBLICATIONS

European Search Report (with translation) EP18160099.0, dated May 29, 2018. (6 pages).

(Continued)

*Primary Examiner* — Philip J Bonzell
(74) *Attorney, Agent, or Firm* — Dority & Manning, P.A.

(57) ABSTRACT

An airworthy, unmanned transport apparatus (1) has a payload container (2) for at least one consignment (14), wherein the transport apparatus (1) has on its underside (4) at least two latching arms (5) which are arranged opposite one another and are each subjected to a spring force and by way of which the payload container (2) is able to be latched onto the transport apparatus (1) such that, as a result of the latching arms (5) being pressed in, the payload container (2) is releasable from the transport apparatus (1).

13 Claims, 3 Drawing Sheets

(56) References Cited

U.S. PATENT DOCUMENTS

| | | | |
|---|---|---|---|
| 2016/0159496 A1 | 6/2016 | O'Toole | |
| 2016/0200438 A1 | 7/2016 | Bokeno et al. | |
| 2016/0340006 A1* | 11/2016 | Tang | B63C 9/01 |
| 2017/0247109 A1* | 8/2017 | Buchmueller | B64D 1/12 |
| 2017/0320572 A1* | 11/2017 | High | B64C 39/024 |
| 2018/0095464 A1* | 4/2018 | Takayama | G05D 1/0038 |
| 2018/0194445 A1* | 7/2018 | Tang | B63C 9/01 |
| 2018/0244389 A1* | 8/2018 | Herlocker | B64D 1/08 |
| 2018/0265222 A1* | 9/2018 | Takagi | G05D 1/102 |
| 2019/0061944 A1* | 2/2019 | Zvara | B64D 9/00 |
| 2019/0100307 A1* | 4/2019 | Beltman | B64C 39/024 |
| 2019/0161190 A1* | 5/2019 | Gil | B64D 1/22 |

FOREIGN PATENT DOCUMENTS

| | | |
|---|---|---|
| DE | 20 2015 105 415 | 12/2015 |
| KR | 101682573 B1 | 12/2016 |
| KR | 101682574 B1 | 12/2016 |
| WO | WO 2014/080389 | 5/2014 |

OTHER PUBLICATIONS

Office Action for DE 10 2017 104 707.7, dated Feb. 14, 2018—7 pages.

Machine Translation of Office Action for DE 10 2017 104 707.7, dated Feb. 14, 2018—7 pages.

\* cited by examiner

US 10,435,156 B2

TRANSPORT APPARATUS

CROSS-REFERENCE TO RELATED APPLICATION

This application is related and claims priority to DE 10 2017 104 707.7, which is hereby incorporated by reference in its entirety for all purposes.

FIELD OF THE INVENTION

The invention relates generally to an airworthy, unmanned transport apparatus having a payload container for at least one consignment, wherein the payload container is able to be attached to an underside of the transport apparatus. Moreover, the invention relates generally to a receiving container having the transport apparatus and to a method for loading an airworthy unmanned transport apparatus that has landed on the receiving container with the payload container for the consignment.

BACKGROUND OF THE INVENTION

As a result of increasing freight transport by general cargo and consolidated cargo shipping, truck or container transport, sea freight or air freight parcel transport in the scope of e-commerce and online mail order supplies, the number of transported goods and in particular of parcel consignments and consignments has increased significantly. Although it is nowadays possible for an order to be placed online independently of conventional shop opening hours, the delivery of the order as a consignment to the recipient takes place almost exclusively by conventional delivery methods, for example through the post or, in the case of parcel consignments, by way of motorized delivery vehicles and mainly only within shop opening hours.

If the recipient of the delivery is not available, for example because, as a working person, they are working during shop opening hours, either an attempt is made to deliver the consignment once again or the consignment is stored at a branch of the delivery organization in order to be retrieved by the recipient. Although it has been possible for some time to store consignments at a collection point, for example in a Packstation, such collection points are not yet available everywhere and thus not always an alternative.

Therefore, in recent times, attempts have increasingly been made to deliver consignments to the recipient or the collection point by unmanned, airworthy transport apparatuses, also known as parcelcopters or drones. In these attempts, a receiving container for receiving the consignment is usually used, to or from which the transport apparatus can convey or retrieve the consignment. Such a receiving container can be set up in the front yard of a recipient's house or be provided as a collection point for a plurality of recipients in a municipality and allows access to the consignment even outside shop opening hours.

In the abovementioned attempts, the actual transfer of the consignment between the unmanned transport apparatus and the receiving container has proven to be particularly difficult. For example it is not possible to "jettison" the consignment from the transport apparatus onto the receiving container when fragile consignments are being transported. Therefore, gripping apparatuses have been tested, but these cannot reliably hold all types of consignment. It is difficult for a gripping apparatus to implement the receiving of different consignments in undefined positions. Alternatively or additionally used exchangeable transport boxes require a large number of actuators for opening the boxes and loading and unloading consignments, and in this regard are also not practicable and are moreover costly.

SUMMARY OF THE INVENTION

An object of the invention is an airworthy, unmanned transport apparatus having a payload container, which is transferable particularly easily to a receiving container.

Accordingly, the object is achieved by an airworthy, unmanned transport apparatus having a payload container for at least one consignment, wherein the transport apparatus has on its underside at least two latching arms which are arranged opposite one another and are each subjected to a spring force, the payload container has on its inner side at least two first detents that are arranged opposite one another and are directed towards one another, and the latching arms have, in a manner corresponding to the at least two first detents, at least two second detents that are arranged opposite one another and are directed away from one another, such that the payload container is able to be latched onto the transport apparatus by the latching arms and, as a result of the latching arms being pressed in, the payload container is releasable from the transport apparatus. The invention also relates to an airworthy, unmanned transport apparatus having a payload container for at least one consignment, wherein the transport apparatus has on its underside at least two latching arms which are arranged opposite one another and are each subjected to a spring force and by way of which the payload container is able to be latched onto the transport apparatus such that, as a result of the latching arms being pressed in, the payload container is releasable from the transport apparatus.

An essential aspect of the invention resides in easy latching of the payload container to the latching arms of the transport apparatus. In a latched state, the payload container is firmly connected to the transport apparatus, and so one or more consignments provided in the payload container can be transported reliably from a sender to a recipient, for example to a receiving container, by the transport apparatus. As a result of being pushed in, the latching arms deform towards one another and release the latching between the payload container and transport apparatus, in order for the payload container to be removed easily from the transport apparatus. It is likewise possible for the payload container to be guided up to the transport apparatus with the latching arms pressed in and to be latched thereto after the latching arms have been released. The spring force has the effect that the latching arms take up a normal position in the unlatched state and are urged back into this normal position when deformed. The spring force also acts counter to undesired releasing of the payload container from the transport apparatus.

Preferably, in the normal position, with the transport apparatus landed on a plane, the latching arms extend perpendicularly away from the transport apparatus in the direction of the ground. Unless described otherwise, it is assumed in the following that the transport apparatus has landed on a plane and the underside of the transport apparatus extends horizontally and parallel to the plane. The latching arms can extend away from the transport apparatus in a planar manner and have for example a rectangular shape. It is likewise possible for a plurality of individual latching arms that are each spaced apart and/or located opposite one another to be provided in each case on opposite sides. In cross section, the two latching arms preferably form a profile in the manner of an inverted U with the underside. During transport, the consignment can be delimited, in particular fully, by the underside of the transport apparatus on its top side, by the payload container on its underside, and by the latching arms and/or the payload container at its sides.

The payload container and/or the transport apparatus are preferably configured such that when the payload container is latched to the transport apparatus, the consignment provided in the payload container is protected from external weather conditions such as moisture. With the payload container latched to the transport apparatus, the consignment arranged in the payload container is preferably partially bounded at its sides by the latching arms, in particular when the consignment is taller than the payload container. The latching arms can be pressed in manually, preferably by pressing in the latching arms arranged opposite one another simultaneously on both sides, advantageously at a position of the latching arms that is as far away from a top side of the transport apparatus as possible.

The unmanned transport apparatus is preferably configured as a flying machine, as an unmanned, uninhabited or unpiloted aerial vehicle, UAV for short, as a parcelcopter or as a drone. Possible embodiments of the transport apparatus include helicopter, multicopter, quadrocopter or tiltwing. The consignment is for example a postal consignment, a parcel, a registered letter, a letter or some other transportable article.

According to a preferred development, the payload container has on its inner side at least two first detents that are arranged opposite one another and are directed towards one another, and the latching arms have, in a manner corresponding to the at least two first detents, at least two second detents that are arranged opposite one another and are directed away from one another. As a result of the payload container being inserted into the transport apparatus, the first detents latch into the second detents. As a result of the latching arms being pressed in, the second detents are unlatched from the first detents. The second detents are preferably provided in an end region of the latching arms away from the underside of the transport apparatus. The detents can be configured as undercuts or other latching devices known from the prior art.

According to a preferred development, the payload container has a peripheral side wall, wherein the first detents are arranged on the inner side of the side wall. Preferably, the first detents are arranged at a distance from a base of the payload container in a peripheral region of the side wall. The payload container can be configured in a trough-like manner and/or have a U-shaped profile in cross section, as is explained further later. Preferably, in the latched state, the payload container engages around the latching arms in an at least partially overlapping manner with its inner sides of the side wall.

According to yet another preferred embodiment, the latching arms and the payload container are embodied to latch together in a form- and/or force-fitting manner. If detents are provided, the detents are preferably embodied to latch together in a form- and/or force-fitting manner. The force fit can be supported and/or brought about by the spring force, which can counteract unlatching of the latching arms latched with the payload container.

As stated above, the latching arms can be pressed in easily by manual actuation of the latching arms. According to a particularly preferred development, an engagement means is provided on each of the latching arms, wherein the engagement means are arranged opposite one another on the latching arms and extend away from one another. Accordingly, the pressing-in of the latching arms can be brought about particularly easily by actuating the engagement means, either manually or by way of a device, such as a shifting device described in the following text. The engagement means is designed for example as a notch, provided preferably on each latching arm and/or provided away from and opposite the underside.

In order to secure the consignment during transport, according to a preferred development, a tensible fixing device is provided between the latching arms, said fixing device being arranged and set up to fix the consignment between the payload container and fixing device when the payload container loaded with the consignment is inserted into the transport apparatus. The fixing device is preferably fastened to both latching arms or directly to the transport apparatus via a separate holding device, in particular in each case opposite the second detents in an end region of the latching arms away from and opposite the underside. If a payload container is not inserted into the transport apparatus, the fixing device is preferably untensioned and/or has a pretension such that the fixing device does not sag between the latching arms. As a result of the insertion, the fixing device is preferably tensioned such that, as a result of the tensioning force, the consignment is secured against slipping in the payload container, in particular is pressed against the payload container. As additional protection against slipping, the payload container can be provided with a rubber lining. The fixing of the consignment is preferably undone by removing the payload container from the transport apparatus.

In this connection, it is particularly preferred for the fixing device to be embodied as a net, as a luggage net, as a tarpaulin, as a rubber sheet and/or as a rubber band, and/or for the payload container to be embodied as a loading tray or transport tray, into which the consignment is able to be inserted. The payload container is preferably designed with a reduced weight and made of plastics material or fibre composite material. The fixing device can extend over a rectangular area, the corners of which are fastened to the latching arms. The area of the fixing device is preferably greater than the area of the top sides of the consignments transported in the payload container.

The object of the invention is also achieved by a receiving container for a transport apparatus, having the transport apparatus as described above, wherein the receiving container has a positioning device which is set up to shift the transport apparatus that has landed on the receiving container first of all into a loading position and then to press at least one of the latching arms in and/or to transfer the latching arms from a pressed-in position into a normal position in which the positioning device no longer acts on the transport apparatus.

In this way, the positioning device allows longitudinal and/or transverse guiding of the transport apparatus that has landed on the receiving container, in order to position the transport apparatus in the loading position. The receiving container can be configured as a post box, parcel box, parcel post box and/or Packstation, or be embodied in a mobile manner as a delivery van, truck, swap body or ship. The positioning device is preferably driven in an electromechanical manner and can include two oppositely arranged pushing members which engage in the engagement means of the latching arms on both sides, in order in this way to shift the transport apparatus that has landed on the receiving container accurately into the loading position. The pushing members engaging in the engagement means to this end move in a parallel manner on the receiving container, for example to the right or left on the receiving container.

In the loading position, even further shifting of the pushing members towards one another causes the latching arms to be pressed in, such that the payload container unlatches from the transport apparatus and can be removed therefrom. As a result of the further shifting, the spacing apart of the pushing members engaging in the engagement members decreases.

In a further scenario, it is possible for a payload container loaded for example with a different consignment to be provided on the receiving container between the latching arms beneath the transport apparatus in the pressed-in position of the pushing members. As a result of the pushing members being moved apart into the normal position, the latching arms engage in the payload container and latch therewith. As a result of the pushing members being moved even further apart, the positioning device no longer acts on the transport apparatus, and so the transport apparatus can fly away from the receiving container to the recipient of the consignment.

In this connection, provision is made, according to a preferred development, for the receiving container to have a loading device which is set up to remove the payload container from the transport apparatus, after at least one of the latching arms has been pressed in by the positioning device, by said payload container being lowered and/or to guide the payload container onto the transport apparatus, with the latching arms in the pressed-in position, by lifting, such that the payload container latches onto the latching arms after the latching arms have been released from the pressed-in position into the normal position.

The receiving container can have a hatch or sliding door through which the loading device can guide the payload container towards the transport apparatus. In addition, a door opening can be provided in the receiving container, through which a sender or recipient of the consignment can deposit the latter in the receiving container or can remove it therefrom. Preferably, the door opening and/or the receiving container is configured such that the sender can deposit the consignment directly in the payload container. Furthermore, a transport system can be installed within the receiving container, said transport system transporting consignments between the loading device and a store. The loading device is configured for example in the manner of a lift or lifting platform.

The transport apparatus and/or the receiving container preferably have mechanical and/or information technology devices which enable the transport apparatus and/or the receiving container to transfer the consignment between the receiving container and transport apparatus. To this end, a microprocessor, a control device and/or a programmable logic controller, which controls the transfer and/or exchanges information between the transport apparatus and the receiving container wirelessly via communications devices, can be provided.

According to a preferred development, the positioning device is set up to effect the shifting of the transport apparatus and pressing-in of the latching arms solely by way of a horizontal movement. The positioning device has a dual function, namely that of positioning the transport apparatus on the receiving container in the loading position by way of a simple horizontal movement, and also that of unlatching the payload container from the transport apparatus, and latching it thereto, likewise by way of the horizontal movement.

The object of the invention is also achieved by a method for loading an airworthy unmanned transport apparatus that has landed on a receiving container with a payload container for a consignment, having a loading device for loading the transport apparatus with the payload container, wherein the transport apparatus has on its underside at least two latching arms that are arranged opposite one another and are each subjected to a spring force, or with the above-described transport apparatus, and having the following steps:

shifting the transport apparatus on the receiving container into a loading position by a shifting device, in the loading position, unlatching the payload container from the transport apparatus by the latching arms being pressed in by the shifting device, and lowering the payload container from the transport apparatus by the loading device.

In a preferred development, the shifting of the transport apparatus and pressing-in of the payload container take place solely by way of a horizontal movement. More preferably, the method includes the following steps: with the latching arms pressed in, lifting the payload container onto the transport apparatus by the loading device until it reaches a loading position, and releasing the latching arms by the shifting device in order to latch the latching arms into the payload container. According to an even more preferred development, a tensible fixing device is provided between the latching arms, and the method includes the following step: by lifting the payload container into the loading position, tensioning the fixing device over the consignment in order to fix the consignment between the fixing device and payload container.

Preferred developments and advantages of the method will be apparent to a person skilled in the art in analogy to the above-described transport apparatus and the above-described receiving container.

BRIEF DESCRIPTION OF THE DRAWINGS

The invention will be explained in more detail in the following text with reference to the accompanying drawings on the basis of a preferred embodiment.

In the drawings

DETAILED DESCRIPTION OF AN EXEMPLARY EMBODIMENT

Figure 1:
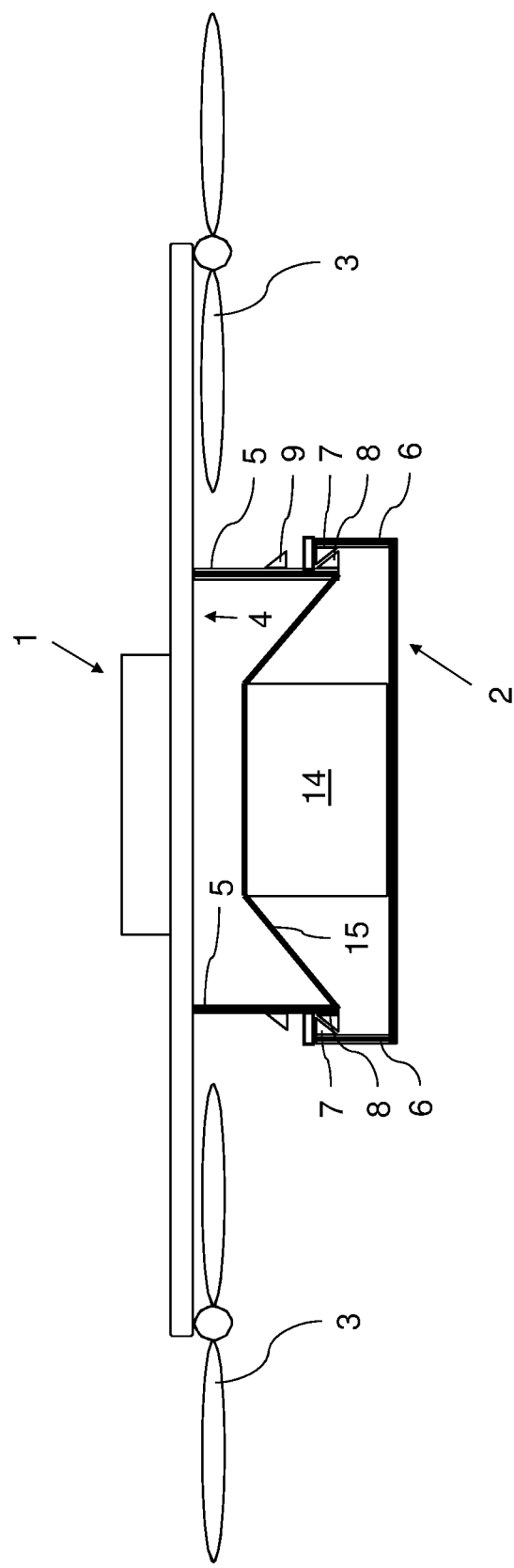
FIG. 1 shows a schematic cross-sectional view of a preferred embodiment of a transport apparatus with a payload container latched thereto.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
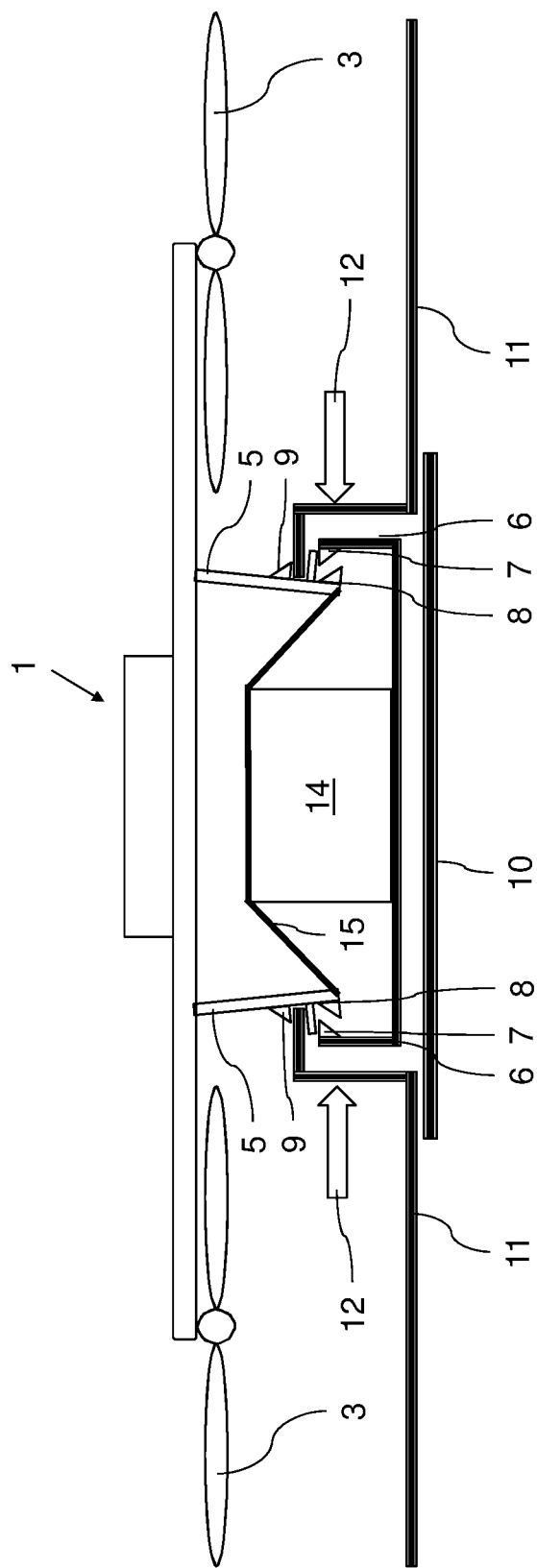
FIG. 2 shows the schematic cross-sectional view of the preferred embodiment of the transport apparatus with the payload container unlatched.
Figure 3:
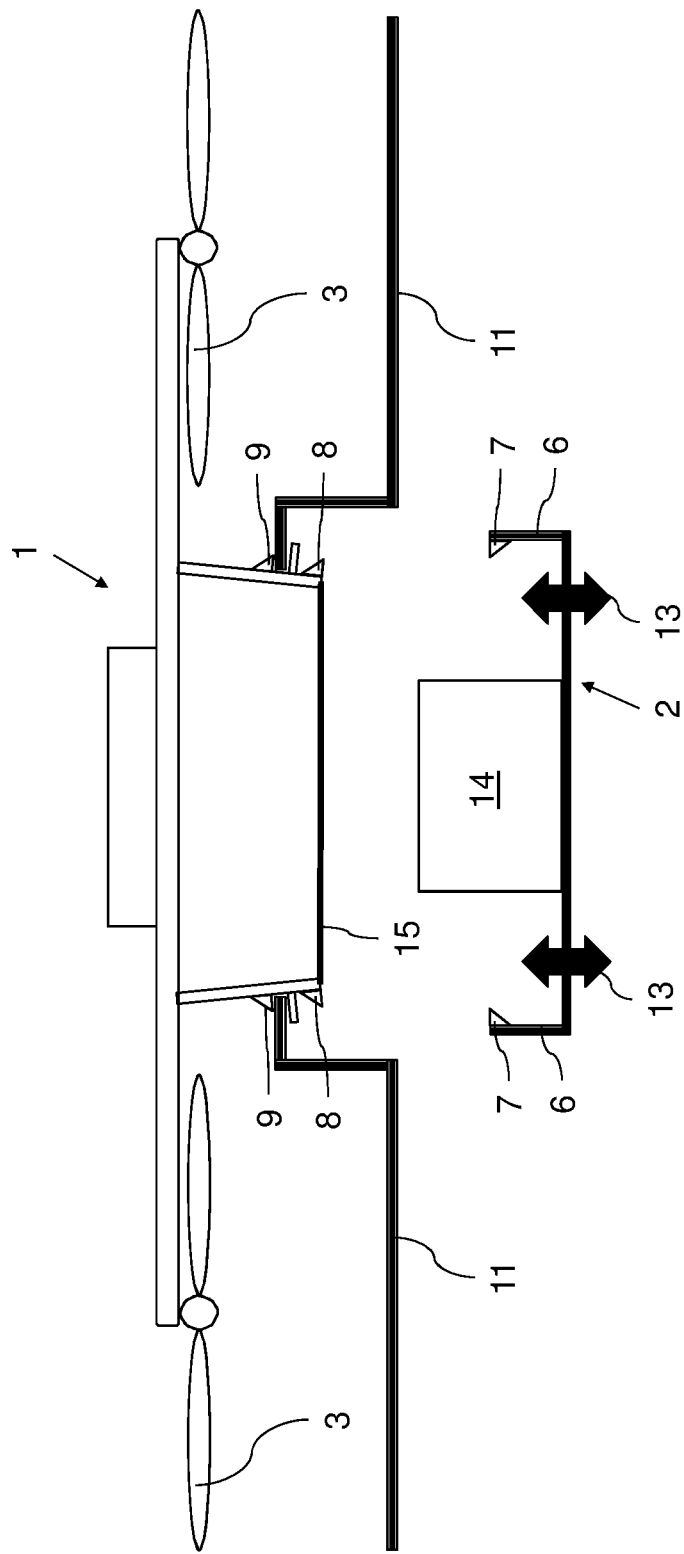
FIG. 3 shows a schematic cross-sectional view of the preferred embodiment of the transport apparatus with the payload container lowered therefrom.

FIGS. 1 to 3 show a schematic cross-sectional view of a transport apparatus 1 having a payload container 2 according to a preferred embodiment of the invention. The transport apparatus is configured as what is known as a parcelcopter and has two propellers 3 arranged opposite one another. The transport apparatus 1 also has information technology devices (not shown) by which the transport apparatus can fly autonomously from a sender to a recipient on the basis of a defined route.

Two latching arms 5 extend perpendicularly downwards away from an underside 4 of the transport apparatus 1, centrally and at a distance from the two propellers 3. The latching arms 5 are configured in a rectangular manner, wherein the upper longitudinal side bears against the underside 4 and the front transverse sides can be seen in the figures. The latching arms 5 are formed integrally with the transport apparatus 1 from a plastics material.

The payload container 2 is designed as an open loading tray with a U-shaped profile, wherein peripheral side walls 6 extend perpendicularly upwards from a base of the payload container 2. In the state shown in the figures and described in more detail in the following text, when the payload container 2 is connected to the transport apparatus, the base of the payload container 2 extends parallel to the underside 4 of the transport apparatus 1.

Arranged on opposite sides on the inner sides of the side walls 6, at a distance from the base of the payload container 2, are first detents 7 which extend towards one another into an interior of the payload container 2. In a manner corresponding thereto, second detents 8 are provided on outer sides of the two latching arms 5 in an end region thereof in each case at a distance from the underside 4, said second detents 8 likewise being arranged on opposite sides and extending away from one another. In the region of the detents 7, 8, the payload container 2 engages around the latching arms 5. In the illustration shown in FIG. 1, the detents 7, 8 are latched together in a form-fitting manner and in this way fix the payload container 2 to the transport apparatus 1.

Provided on the outer sides of the latching arms 8, on the same side as the second detents 8, above the latter and at a distance from the underside 4, are engagement means 9 which are correspondingly arranged at the same height on the latching arms 5 on opposite sides and extend away from one another.

In FIG. 2, the transport apparatus 1 has landed on a receiving container 10, illustrated as a horizontal line 10. A positioning device 11 provided on the receiving container 10 engages in the engagement means 9 on both sides and shifts the transport apparatus 1 on the receiving container 10 into a loading position. The positioning device 11 has two pushing members arranged opposite one another, which move solely in the horizontal direction and maintain a constant spacing during shifting, when the pushing members engage in the engagement means 9 in a contacting manner.

In order to release the payload container 2 from the transport device 1 in the loading position, the pushing members move towards one another in the direction of the arrows 12 with a further horizontal movement. In this way, the positioning device 11 presses the latching arms 5 in counter to a spring force acting thereon. As a result of being pressed in, the latching arms 5 unlatch from the payload container 2. Specifically, the second detents 8 unlatch from the first detents 7 and the form-fitting connection between the transport apparatus 1 and payload container 2 is undone, as shown in FIG. 3.

As a result, a loading device, symbolized by arrows 13, provided in the receiving container 10 can lower the payload container 2 released in this way through a hatch or sliding door (not shown) from the transport apparatus 1 into the receiving container 10. After the sliding door has been opened, the consignment 14 can be unloaded, together with the payload container 2, into an interior of the receiving container 10. The loading device 13 is configured as a lift or lifting platform.

Within the receiving container 10, which is configured for example as a Packstation or is part of a post box or delivery van, it is then possible for a consignment 14 provided on the base of the payload container 2 to be unloaded from the payload container 2. The consignment 14 is able to be temporarily stored in the receiving container 10 and/or is retrievable by a recipient of the consignment 14.

The payload container 2, optionally loaded with a further consignment 14, can, starting from the position shown in FIG. 3, be moved towards the transport apparatus 1 by the loading device 13, until the consignment 14 comes to rest in the position, shown in 2o FIG. 2, between the latching arms 5. After the latching arms 5 have been released from the pressed-in position shown in FIG. 2 into a normal position, as shown in FIG. 1, in which the positioning device 11 no longer acts on the transport apparatus, the payload container 2 is latched with the transport apparatus 1. As a result, the transport apparatus 1 can supply the consignment 14 to a recipient.

In order to fix the consignment 14 so that it does not slip during a flight of the transport apparatus 1, a tensible fixing device 15 is provided between the latching arms 5, said fixing device 15 being fastened at its opposite ends to the end regions of the latching arms 5 in the region of the second detents 8 on the inside on the opposite side from the latter. The fixing device 15 is configured as a rectangular luggage net and is pretensioned when the payload container 2 is not latched, as is apparent from FIG. 3.

As a result of the payload container 2 being lifted, the consignment 14 comes into contact, with its top side, with the fixing device 15, which fixes the consignment 14 on the payload container 2. In the position, shown in FIG. 1, of the payload container 2 latched with the transport apparatus 1, the fixing device 15 engages around the top side of the consignment 14 and secures the consignment 14 against slipping during transport.

As a result, the invention provides a simple and reliable possibility of orienting a parcelcopter, as transport apparatus 1, that has landed somewhat accurately on a receiving container 10 as landing site, by the positioning device 11, as linearly shiftable mechanism, via a sliding door of the receiving container 10 as landing site. With the same mechanism, the form fit between the payload container 2 and transport apparatus 1 is releasable such that the payload container 2 can be removed, together with the consignment 14, through the sliding door of the transport apparatus 1. Analogously, a further payload container 2 with a further consignment 14 is fastenable to the transport apparatus 1.

Modifications and variations can be made to the embodiments illustrated or described herein without departing from the scope and spirit of the invention as set forth in the appended claims.

LIST OF REFERENCE SIGNS

Transport apparatus 1
Payload container 2
Propeller 3
Underside 4
Latching arm 5
Side wall 6
First detent 7
Second detent 8
Engagement means 9

Receiving device 10
Positioning device 11
Arrow 12
Loading device 13
Consignment 14
Fixing device 15

The invention claimed is:

1. An airworthy, unmanned transport apparatus, comprising a payload container for at least one consignment, wherein
   the transport apparatus has on its underside at least two latching arms which are arranged opposite one another and are each subjected to a spring force,
   the payload container has on its inner side at least two first detents that are arranged opposite one another and are directed towards one another, and
   the latching arms have, in a manner corresponding to the at least two first detents, at least two second detents that are arranged opposite one another and are directed away from one another such that the payload container is latchable onto the transport apparatus by the latching arms and, as a result of the latching arms being pressed in, the payload container is releasable from the transport apparatus.

2. The transport apparatus according to the claim 1, wherein the payload container has a peripheral side wall and the first detents are arranged on the inner side of the side wall.

3. The transport apparatus according to claim 1, wherein the latching arms and the payload container are configured to latch together in a form- and/or force-fitting manner.

4. The transport apparatus according to claim 1, wherein an engagement means is provided on each of the latching arms, the engagement means are arranged opposite one another and extend away from one another.

5. The transport apparatus according to claim 1, having the at least one consignment and a tensible fixing device provided between the latching arms, said fixing device configured to fix the at least one consignment between the payload container and the tensible fixing device when the payload container loaded with the at least one consignment is inserted into the transport apparatus.

6. The transport apparatus according to claim 5, wherein the tensible fixing device comprises one or more of a net, a luggage net, a tarpaulin, an elastic sheet and an elastic band, and/or the payload container comprises a loading tray or a transport tray, into which the at least one consignment is insertable.

7. A receiving container for the transport apparatus according to claim 1, wherein the receiving container has a positioning device which is configured to first shift the transport apparatus into a loading position when the transport apparatus has landed on the receiving container and then to press at least one of the latching arms in and/or to transfer the latching arms from a pressed-in position into a normal position in which the positioning device no longer acts on the transport apparatus.

8. The receiving container according claim 7, wherein the receiving container has a loading device which is configured to remove the payload container from the transport apparatus, after at least one of the latching arms has been pressed in by the positioning device, by said payload container being lowered and/or to guide the payload container onto the transport apparatus, with the latching arms in the pressed-in position, by lifting, such that the payload container latches onto the latching arms after the latching arms have been released from the pressed-in position into the normal position.

9. The receiving container according to claim 7, wherein the positioning device is configured to effect the shifting of the transport apparatus and pressing-in of the latching arms solely by way of a horizontal movement.

10. A method for loading the airworthy unmanned transport apparatus of claim 1 that has landed on a receiving container, comprising:
    shifting the transport apparatus on the receiving container into a loading position by a positioning device;
    in the loading position, unlatching the payload container from the transport apparatus by the latching arms being pressed in by the positioning device; and
    lowering the payload container from the transport apparatus by the loading device.

11. The method according to claim 10, wherein the shifting and pressing-in take place solely by way of a horizontal movement.

12. The method according to claim 10, further comprising:
    with the latching arms pressed in, lifting the payload container onto the transport apparatus with the loading device until the payload container reaches a loading position; and
    releasing the latching arms by the positioning device in order to latch the latching arms into the payload container.

13. The method according to claim 10, wherein a tensible fixing device is provided between the latching arms, and further comprising:
    by lifting the payload container into the loading position, tensioning the fixing device over the at least one consignment in order to fix the at least one consignment between the fixing device and payload container.

* * * * *